(12) United States Patent
Mallamo

(10) Patent No.: US 6,571,143 B1
(45) Date of Patent: May 27, 2003

(54) GOLF SCORING SYSTEM FOR A GOLF COMPETITION

(76) Inventor: James Mallamo, P.O. Box 30098, Palm Beach Gardens, FL (US) 33420

( * ) Notice: Subject to any disclaimer, the term of this patent is extended or adjusted under 35 U.S.C. 154(b) by 0 days.

(21) Appl. No.: 09/665,032

(22) Filed: Sep. 19, 2000

Related U.S. Application Data

(60) Provisional application No. 60/154,714, filed on Sep. 19, 1999.

(51) Int. Cl.[7] .................................................. A63F 9/24
(52) U.S. Cl. ........................................ 700/92; 473/131
(58) Field of Search ................... 700/92, 91; 473/150, 473/168–169, 171, 409, 131; 273/317.2, 108.2

(56) References Cited

U.S. PATENT DOCUMENTS

| 4,910,677 | A | * | 3/1990 | Remedio et al. ............. 364/410 |
| 4,988,105 | A | * | 1/1991 | Perry et al. .............. 273/176 A |
| 5,283,733 | A | * | 2/1994 | Colley .......................... 364/411 |
| 5,439,224 | A | * | 8/1995 | Bertoncino ............. 273/182 A |
| 5,504,312 | A | * | 4/1996 | Morrison et al. ........... 235/487 |
| 5,562,550 | A | * | 10/1996 | Chartrand ................... 473/131 |
| 5,564,988 | A | * | 10/1996 | Brooks ........................ 473/150 |
| 5,588,652 | A | * | 12/1996 | Lang ........................... 473/168 |
| 5,658,210 | A | * | 8/1997 | Cornell ....................... 473/407 |
| 5,738,594 | A | * | 4/1998 | Kinney ....................... 473/171 |
| 5,779,549 | A | * | 7/1998 | Walker et al. ................ 463/42 |
| 5,779,566 | A | * | 7/1998 | Wilens ........................ 473/407 |
| 5,949,679 | A | * | 9/1999 | Born et al. .............. 364/410.1 |
| RE36,346 | E | * | 10/1999 | Germain ................... 364/411.1 |
| 6,012,987 | A | * | 1/2000 | Nation ........................ 473/156 |
| 6,062,991 | A | * | 5/2000 | Moriarty et al. ............ 473/407 |
| 6,074,312 | A | * | 6/2000 | Lyon et al. .................. 473/409 |
| 6,321,128 | B1 | * | 11/2001 | Costin et al. ................ 473/131 |

OTHER PUBLICATIONS

USGA, USGA Course Rating History, [online], [retrieved on Aug. 20, 2002]. Retrieved from the Internet:<http://www.usga.org/handicap/CRHistory.html>.*

USGA, USGA Course Rating Procedure, [online], [retrieved on Aug. 20, 2002]. Retrieved from the Internet:<http://www.usga.org/handicap/CourseRating.html>.*

(List continued on next page.)

Primary Examiner—Valencia Martin-Wallace
Assistant Examiner—Scott E. Jones
(74) Attorney, Agent, or Firm—Frank A. Cona

(57) ABSTRACT

The present invention includes a golf scoring system for at least one golf competition, wherein at least one participant plays at a first geographic location with a set of results and at least one participant plays at a second geographic location with another set of results. This system includes determining at least one normalizing factor for each of the geographic locations relative to each other; compiling results from each of the participants; applying the normalizing factor to each of the results; and determining a final score for each of the participants. The normalizing factor can be stored in a data source; wherein the results are compiled also stored in the data source. The final score for each of the participants may also be stored in the data source and users can access the data source to view the final score for each of the participants. Moreover, participants can communicate with each other using email or chat rooms.

42 Claims, 2 Drawing Sheets

OTHER PUBLICATIONS

USGA, USGA a Head for Ratings, [online], [retrieved on Aug. 20, 2002]. Retrieved from the Internet:<http://www.usga.org/handicap/articles/AHeadforCR.html>.*

PGATOUR.COM, Slope Ratings, [online], [retrieved on Aug. 20, 2002]. Retrieved from the Internet:<http://golfweb.com/u/ce/multi/pgatour/0,1977,2386668,00.html>.*

PGATOUR.COM, 1980 All–Around Ranking, [online], [retrieved on Aug. 20, 2002]. Retrieved from the Internet:<http://pgatour.com/stats/1980/r_127.html>.*

PGATOUR.COM, 1992 Longest Drive, [online], [retrieved on Aug. 20, 2002]. Retrieved from the Internet:<http://pgatour.com/stats/1992/r_159.html>.*

PGATOUR.COM, 1980 Money Leaders, [online], [retrieved on Aug. 20, 2002]. Retrieved from the Internet:<http://pgatour.com/stats/1980/r_109.html>.*

PGATOUR.COM, 1990 PGA Championship Points, [online], [retrieved on Aug. 20, 2002]. Retrieved from the Internet:<http://pgatour.com/stats/1990/r_132.html>.*

PGATOUR.COM, 1986 Putting Average, [online], [retrieved on Aug. 20, 2002]. Retrieved from the Internet:<http://pgatour.com/stats/1986/r_104.html>.*

Larson/Hostetler/Edwards, Calculus with Analytical Geometry, 1990, $4^{th}$ Edition, pp. 713–717.*

* cited by examiner

GOLF SCORING SYSTEM FOR A GOLF COMPETITION

CROSS-REFERENCE TO RELATED APPLICATION

This application is a continuation of Provisional Patent Application Ser. No. 60/154,714 filed on Sep. 19, 1999.

STATEMENT REGARDING FEDERALLY SPONSORED RESEARCH

Not applicable.

REFERENCE TO MICROFICHE APPENDIX

Not applicable.

BACKGROUND OF THE INVENTION

1. Field of the Invention

The present invention relates to a system for tracking and comparing golf scores from geographically diverse location through the use of a computer network, and particularly to a system verifying tabulating geographically diverse golf scores using the Internet.

2. Description of the Prior Art

Historically, golf competitions have been conducted on one course in one specific geographic location. Each competition is localized and is conducted at one period of time to put all participants on equal footing. It has previously been extremely difficult, if not impossible, to effectively conduct a single golf competition in geographically diverse areas due to variations in playing conditions and the inability to quickly communicate and compare competition results. Moreover, the disparity in course conditions due to weather and other factors has prevented competitions held at multiple locations because the participants cannot be scored on an equal footing.

The advent of computers and computer networks has enhanced the speed with which participants, who may be playing on different holes on the same golf course, may quickly communicate their scores to a central location, may compute their handicap or ranking, and may rate themselves against other players. Examples of such conventional systems are shown in U.S. Pat. Nos. 5,949,679; 5,283,733; and 4,910;677—the contents of which are hereby incorporated by reference herein. However, these prior art system all have the distinct disadvantage that they do not allow for the same competition to be held on multiple courses or in multiple locations.

Accordingly, there is a growing need to provide a scoring system that allows participants to compete in a single competition on a national and even international basis, while playing in geographically diverse locations and differing periods of times. Moreover, a system is needed for effectively compiling player scores from each location, calculating the results and determining rankings.

SUMMARY OF THE INVENTION

The present invention includes a golf scoring system for at least one golf competition, wherein at least one participant plays at a first geographic location with a set of results and at least one participant plays at a second geographic location with another set of results. This system includes determining at least one normalizing factor for each of the geographic locations relative to each other; compiling results from each of the participants; applying the normalizing to each of the results; and determining a final score for each of the participants.

The normalizing factor can be stored in a data source; wherein the results are also compiled and stored in the data source. The final score for each of the participants may also be stored in the data source and users can access the data source to view the final score for each of the participants. Moreover, participants can communicate with each other using email or chat rooms.

DETAILED DESCRIPTION OF THE PREFERRED EMBODIMENT

The present invention will be understood more fully from the detailed description given below and from the accompanying drawings of preferred embodiments of the invention which, however, should not be taken to limit the invention to a specific embodiment but are for explanation and understanding only.

A system is needed for effectively conducting a single golf competition in geographically diverse locations. A system is further needed for compiling scoring information and processing the results. One preferred means of transmitting information over geographically diverse locations in use today is the Internet.

The Internet is a vast "network of networks" connecting a large number of computer networks and sub-networks to each other through several regional backbone systems around the world. One portion of the Internet, the World Wide Web ("Web"), is growing at a rapid pace, as more and more businesses go online.

The Web is the most popular segment of the Internet today because it allows users to interact with each other and access content through a graphical user interface, or "GUI." The most commonly used GUI's are Web browsers, which are software, applications that allow users to access and view electronic documents in a browser window.

Web documents are created using Hypertext Markup Language ("HTML"), which allows authors to add special format tags to plain text documents to control the appearance of the text in the Web browser. HTML tags also allow for the insertion of additional components into the Web document, such as image files, audio files, and applets. Applets are small pieces of programming code that are run on the user's computer when downloaded. Applets allow for such effects as scrolling text and animation, and for use in the secure transfer of information across the Internet.

To enhance security, the scoring server may use Secure Socket Layer ("SSL") technology, which is widely known by those skilled in the art and is integrated into most commercially acceptable web browsers.

The following is a description of the score collection and computation system of the present invention. In a preferred embodiment of the invention (although not limited thereto), individual scores from each geographic location are submitted over the Internet, such as through the use of a series of HTML forms, to a scoring server, which stores this information in a data source. From this information, all scores are calculated for each phase of the single golf competition to achieve a total score for each participant at each location. These scores are then normalized to account for changes in each location due to weather, providing a normalized score.

This allows for a single competition to be conducted in diverse geographic locations.

Figure 1:
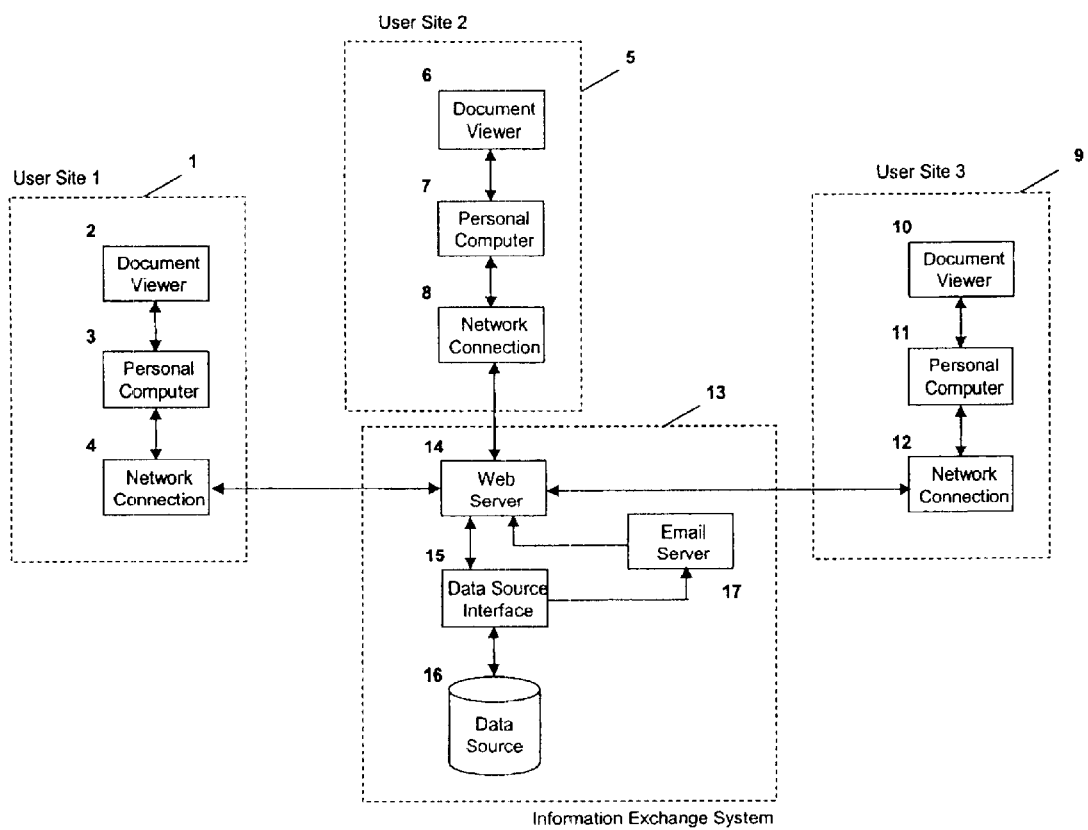
FIG. 1 is a block diagram illustrating a preferred embodiment of the present invention used over the Internet.

FIG. 1 is a schematic demonstrating the typical components used in a preferred embodiment of the invention when used over the Internet. In this example, there are three User Sites, which may be located, for example, at one of the golf courses used for a competition, at the home of one of the participants, or at the home or office of one or more of the organizers of the competition.

An electronic document, such as a web page created using HTML, is loaded into Document Viewer 2, 6, or 10 by a user. The document viewer may be any software application capable of viewing electronic documents and loading additional electronic documents from within the original document, such as through the use of a hypertext link (although not limited thereto).

For example, the document viewer could include a Web browser, such as Navigator from Netscape Communications or Microsoft's Internet Explorer. The electronic document may be loaded automatically when the document viewer is first started, or may be opened into the viewer by the user from a file stored locally or at a remote URL. For example, the user may load the document by typing the document's URL into the Web browser's command line.

Document Viewer 2, 6, or 10 may be accessed by the user through any of a number of computer systems, such as through the use of a terminal connected to a mainframe system, from a personal computer, or over computer connected to a local computer network.

Document Viewer 2, 6, or 10 is connected to the Internet along with other document viewers and computers, such as Personal Computer 3, 7, or 11 through Network Connection 4, 8, or 12. This connection is typically made through local telephone lines using an analog, ISDN, or DSL modem, though it can be over a direct network connection, such as an Ethernet network. The administrator of the network connection (e.g. an Internet Service Provider or "ISP") maintains a computer network that routes any requests from the document viewer to the appropriate location on the Internet. This is accomplished in a conventional manner, such as through the use of a modem pool connected to a local server and Internet gateway (not shown). The network connects the document viewer to Information Exchange System 13 through any of a number of well-known connection schemes, such as through the use of leased lines.

Information Exchange System 13 may comprise Web Server 14, Data Source Interface 15, Data Source 16, and Email Server 17, the operation and interrelation of which will be described in more detail below.

Web Server 14 is typically a software application running on a remote computer that is capable of forwarding or processing HTTP requests from each document viewer. For example, Web Server 14 may include any one of a number of well-known server applications, such as the NSCA Web server, the Apache Web server, etc. Web Server 14 passes a document request from a document viewer to Data Source 16 using Data Source Interface 15.

Information is transmitted over the Internet using the TCP/IP protocol. With this protocol, each location on the Internet, typically a specific computer or Web server, has its own unique IP (Internet Protocol) address. This address identifies where that computer or server is located on the network.

After a Web document is loaded into the document viewer, the document viewer waits until the hypertext link is activated, generating a signal to Web Server 14 in Information Exchange System 13. This is preferably in the form of an HTTP request sent Over the Internet using TCP/IP and SSL. The HTTP request may include a request for scoring information, submitted scoring information, or both. It will be appreciated that the details of HTTP operation in conjunction with TCP/IP are well known to those of ordinary skill in the art and will, therefore, not be elaborated on here.

When the HTTP request is received by Web Server 14, Web Server 14 accesses Data Source 16 using Data Source Interface 15 to retrieve any requested information, or to submit information, based upon signal from the document viewer. In one embodiment of the invention, Web Server 14 would receive the HTTP request from Document Viewer 1, parsing the request to determine the desired information. In this embodiment, the requested information is accessed in Data Source 16 by using a common gateway interface ("CGI") program, well known to those of skill in the art, as Data Interface 15. This program acts as an interface between the server and the data source by executing a set of instructions based upon the information received by the server in the HTTP request and passed by the server to the CGI program.

The CGI program can take a number of forms which are well known in the art, such as PERL scripting, C++ modules, or other common programming languages. The interaction of Web servers and CGI programs and the sending of information therebetween is well known to those of ordinary skill in the art.

The CGI program may extract the document location information, e.g. the URL, from the information passed to it by Web Server 14 and retrieve a scoring record or records from the data source. Conversely, it may also submit scoring information as well. This may be accomplished in a number of ways known to those of ordinary skill in the art. For example, if the CGI program is a PERL script, a database access module, can be used in connection with any number of database packages, such as to interface with the majority of commercial relational database applications. Examples of such databases include Oracle, Sybase, Microsoft Access, and the like.

Records are stored and retrieved by passing SQL statements to the database and loading the results into the CGI program. The CGI program may then compare the records stored in Data Source 16 with any new results received from the document viewer. Once all of the required scoring information has been received from each location, the program would then compute the final scores and rankings for each participant based upon the specific factors used in the scoring system.

The following is a description of the preferred scoring system of the present invention, used in connection with a three-part golf competition involving a driving phase, a pitching, or "chipping" phase, and a putting phase (although not limited thereto). Individual scores from each geographic location are calculated for each phase of the competition to determine the results for each participant at each location. These results are then normalized to account for changes in each location due to weather, providing a normalized final score.

Of course, results may be normalized, using a variety of other factors, including terrain, climate, and course and/or hole difficulty. Many golf courses and holes, and players themselves are rated by numerous organizations using several methods, typically based upon relative difficulty. For example, a player's scoring ability may be rated to the scoring ability of an expert amateur playing on a course of standard difficulty. A course may be rated based upon the playing difficulty of a course for scratch golfers under normal conditions based on yardage and other obstacles that affect their scoring ability. Or, a course may be rated based upon how much more difficult the course plays for individuals who are not scratch golfers.

Participant results may be submitted to Information Exchange System 13 via a document viewer, as previously described. A CGI script or other conventional program may then be used to calculate the normalized score and rankings in a number of conventional ways well known in the art.

Driving Competition

The area selected for the driving competition is preferably as "flat" as possible to ensure a "true test" of ability. The driving area or range is preferably 50 yards wide. In the preferred embodiment of the invention, driving scores are calculated as the total yardage (that is, the distance the ball travels when struck), minus the distance from the centerline, using the best of 3 shots.

Figure 2:
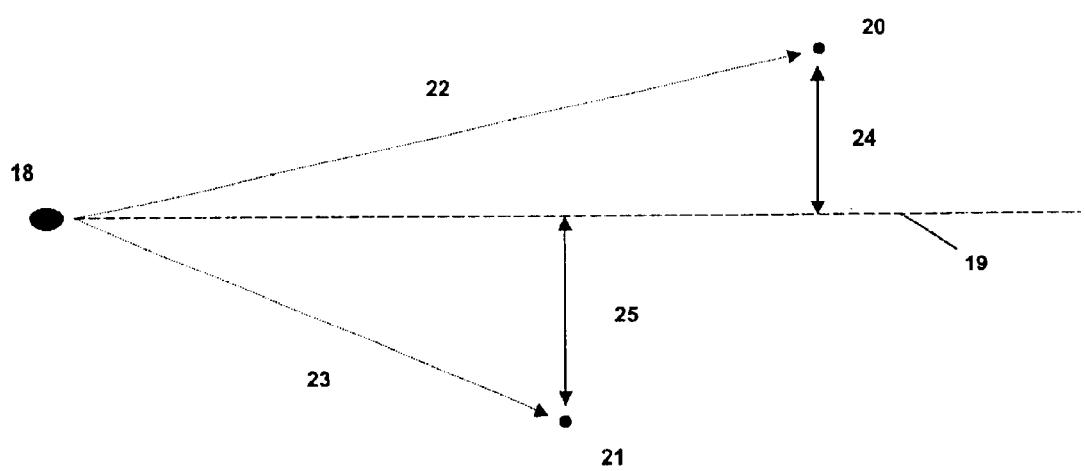
FIG. 2 is a diagram illustrating the scoring of the driving portion of the preferred embodiment of the invention.

For example, 225-yard drive that is 25 yards away from the centerline would be scored as a total driving distance of 200 yards. The total score would then be calculated as follows: 225 minus 25 a score of 200. This is illustrated in FIG. 2. Golfer 18 drives the ball having centerline 19. In one drive, the ball lands at position 20 and in another at position 21. The ball at position 20 and 21 is a certain yardage out, as measured along lines 22 and 23, respectively. However, the ball is also distance 24 and 25 off the centerline, respectively, and must be penalized accordingly.

The scoring system of the present invention has the significant advantage over the prior art that it allows for adverse weather conditions, such as wet playing areas and prevailing winds, and can normalize scores to simulate ideal playing conditions worldwide, regardless of the actual weather. Differing weather conditions can be accounted for in the system of the present invention, for example, by multiplying each participant's score by a weighting percentage based upon pre-selected weather criteria.

For example, the following criteria could be used and percentages could be used to normalize the scores on the driving aspect of the competition on one course at one location, relative to the conditions at a second course at another location:

| Condition: | Weighting: |
|---|---|
| Wet | +8% |
| Dry | -8% |
| Wind/Against | +12% |
| Wind/With | -12% |
| Wind/Across | +6% |

Normalizing the scores in this manner provides the significant advantage that the scores from geographically diverse areas can be equated, so that a single competition can be had on a national and even worldwide level. This is a distinct advantage over previous scoring systems, which have had to limit a competition to a specific course and location.

Pitching Competition

In the preferred embodiment of the invention, the pitching scores are determined by measuring the exact feet and inches away from the hole. This distance may then be converted to inches and subtracted from 360. As with the driving competition, the best of 3 shots is preferably used. In addition, it is preferred that the "best" shot be within 30 feet of the hole to earn any points. A distance greater than 30 feet would then equal zero points. The pitching score calculation is illustrated by the following example. A pitch that is 10 feet and 6 inches (126 total inches) away from the hole would be scored as follows: 360 minus 126=a score of 234.

For a child's golf competition, the length required for each pitch may be segmented by age as follows or some other weighting factor:

| Age: | Distance: |
|---|---|
| Under 7 years | 10 Yard Shot |
| 8–10 years | 20 Yard Shot |
| 11–14 years | 40 Yard Shot |
| 15–17 years | 60 Yard Shot |

Putting Competition

In accordance with the scoring system of the present invention, the green selected for the putting competition is preferably consistent with regular playing conditions and designated as follows:

| Holes: | Length: |
|---|---|
| 1, 2 and 3 | 10 ft. |
| 4, 5 and 6 | 20 ft. |
| 7, 8 and 9 | 30 ft. |

Putting scores are preferably calculated based upon the total score for all 9 holes. Each player's total score is multiplied by 10 and then subtract from 360. In addition, the maximum number of strokes allowed on each hole is 4. Different holes of different courses at different locations may be weighted based upon the relative difficulty of the hole, similar to the weighting of the driving and pitching score.

An example of the putting score calculation based upon a total of 21 putts over a designated 9-hole course would be scored as follows: 21×10=210 and 360−210=a score of 150.

Total Score

Generally, total scores using the system of the present invention will range from 200 to 900, with 900 being the best score. In the case of a tie, cards may be matched starting with the putting competition. Calculations should begin with the 9th hole with scores compared working backwards. Cards may also be matched in the pitching competition and also in the driving competition. Finally, if absolutely necessary, grade point averages (for children's competitions) or some other indicator can be used to break any remaining ties.

These scores are then stored in Data Source 16, and may be provided to the participants through a variety of means well known to those of skill in the arts, such as email notification through Email Server 17, or a series of HTML Web pages, which may or may not be password protected.

Other embodiments of the invention may include other forms of securely encoding information into the document returned by Information Exchange System 13. For example, cryptography and stenographic systems may be employed. Such systems are well known to those of skill in the art.

If the document is improperly taken and used by another this can be detected through a comparison of the information encoded in the file with that stored in Data Source 16. Web Server 14 or Document Viewer 2, 6, or 10 may decrypt the encoded information and compares it with the information stored in Data Source 16. This may be accomplished through the use of a CGI program, as discussed above.

Participants in the skills challenge, as well as the organizers, can also communicate with each other using Email Server 17, sending messages to each other using electronic mail. Information Exchange System 13 could also include a real-time chat room in Web Server 14, to allow real time communication during and after each competition. As commonly known in the art, a chat room comprises software that allows users to correspond dynamically in real-time using text messages that they type into their keyboard. Often software for sending the text messages is incorporated into the document viewer, and is well known in the art. Messages can even be translated into different languages by using translation software, such as that provided by the AltaVista search engine or Systran.

Hypothetical Competition

The operation of the above-described scoring system in the preferred embodiment of the invention will now be described in connection with a hypothetical competition.

In the month of July, a world wide junior golfer's skills challenge is held. The first weekend, one competition is held with a first set of children, ages 17 and under, at Course A in West Palm Beach, Fla., and on another weekend another competition is held with another set of children, also ages 17 and under, at Course B in Stockholm, Sweden. The remaining competitions will be ignored in this example.

The weather during the competition in West Palm Beach, Fla. is sunny and dry, but the wind is blowing strong across the course. The weather during the competition in Stockholm, Sweden is rainy but the wind is blowing in the direction of the drives. The fairways and greens at Course A and Course B are very similar in layout and complexity.

The best of three shots is used for each of the driving and pitching phases of each competition. The length of shot required for each of the pitching and putting phases are as previously illustrated. Weightings of −8% (for dryness) and +6% (for wind across) are applied to the driving scores at Course A, while weightings of +8% and −12% are applied to driving scores at Course B. These conditions are entered into Data Source 16 in Information Exchange System 13 by the organizers of the skills challenge through a document viewer, in the manner previously described, subsequent to the competitions and prior to the final tallying of scores.

Child A is 10 years old and lives in the West Palm Beach area. She enters the competition at Course A, which is near her home. During the competition, she drives the ball 190 yards out on the centerline, 180 yards out and 10 yards of center, and 195 yards out and 5 yards off center. From 20 yards away, she pitches the ball 10 ft. 3 in. from the hole, then 13 ft. 1 in., and then 9 ft. 8 in. For the putting portion of the competition, she completes each putt as follows:

| Hole: | Strokes: | Distance: |
|---|---|---|
| 1 | 2 | 10 ft. |
| 2 | 3 | 10 ft. |
| 3 | 1 | 10 ft. |
| 4 | 3 | 20 ft. |
| 5 | 2 | 20 ft. |
| 6 | 2 | 20 ft. |
| 7 | 3 | 30 ft. |
| 8 | 2 | 30 ft. |
| 9 | 4 | 30 ft. |
| Total: | 22 | |

After the competition at Course A is completed, Child A's results are submitted to Data Source 16 in Information Exchange System 13 through the document viewer in the manner previously described. This may be done by Child A and her family or by the organizers of the skills challenge.

Child B is 16 years old and lives in near Stockholm, Sweden. He enters the competition at Course B, which is near his home. During the competition, he drives the ball 210 yards out and 15 yards of the centerline, 225 yards out and 10 yards off center, and 220 yards out and 20 yards off center. From 60 yards away, he pitches the ball 20 ft. 10 in. from the hole, then 30 ft. 5 in., and then 15 ft. 1 in. For the putting portion of the competition, he completes each putt as follows:

| Hole: | Strokes: | Distance: |
|---|---|---|
| 1 | 1 | 10 ft. |
| 2 | 2 | 10 ft. |
| 3 | 2 | 10 ft. |
| 4 | 3 | 20 ft. |
| 5 | 3 | 20 ft. |
| 6 | 2 | 20 ft. |
| 7 | 3 | 30 ft. |
| 8 | 4 | 30 ft. |
| 9 | 4 | 30 ft. |
| Total: | 24 | |

As with Child A, Child B's results are also uploaded to Data Source 16.

The results of the entire skills challenge are then tallied and scored by Data Interface 15. Child A's final score is calculated as $190*(0.98)+(360-116)+(360-22*10)=186+244+140=570$. Child B's final score is calculated as $215*(0.96)+(360-181)+(360-24*10)=206+179+120=505$. Accordingly, Child A is ranked higher in the skills challenge than Child B.

The present invention has the significant advantage that it enabled Child A and Child B to complete against each other in the same skills challenge near their homes, without expensive travel costs, and even though they played on different courses in different parts of the world on different weekends.

Although this invention has been described with reference to particular embodiments, it will be appreciated that many variations may be resorted to without departing from the spirit and scope of this invention. For example, the invention may be utilized on any computer network, such as intranets and other internetworked systems, and is not limited to the Internet or the World Wide Web. It will also be appreciated that many combinations of Web servers and CGI applications may used for accessing the data source, and the data source may be other than a relational database, such as an ACSII text file, or some other type of binary file. Also, if HTML code is used to contain the scoring information, this information may take a variety of forms other than the URL encoded key pairs described herein, such as hidden variable in the HTML code. The criteria used to weight the different portions of the competition may also include factors other than environmental condition, such as geographic features of the course, its overall determined level of difficulty, etc.

What is claimed is:

1. In a golf scoring method for a golf competition, wherein at least one participant plays in said competition at a first geographic location with a set of results used to determine a final score in said competition and at least one participant plays in said competition at a second geographic location with another set of results used to determine another final score in said competition, wherein said geographic locations are diverse, said method comprising the steps of:

determining at least one normalizing factor for each of said diverse geographic locations relative to each other, said normalizing factor being based upon current information at the time each of said participants plays at said first and second geographic locations;

compiling said results from each of said participants from each of said diverse geographic locations;

applying said normalizing factor to each of said results; and determining a final score for said competition for each of said participants.

2. The method of claim 1, further comprising the steps of storing said normalizing factor in a data source; compiling said results, storing said results in said data source; and storing said final score for each of said participants in said data source.

3. The method of claim 2, further comprising the step of allowing access to said data source to view said final score for each of said participants.

4. The method of claim 1, further comprising the step of allowing each of said participants to communicate with each other using email.

5. The method of claim 1, further comprising the step of allowing each of said participants to communicate with each other using a chat room.

6. The method of claim 1, wherein said normalizing factor is based upon one or more selected from the group consisting of weather conditions at said geographic locations, the layout of said geographic locations, the complexity of said geographic locations, the playing difficulty of said geographic locations from scratch golfers, the playing difficulty of said geographic locations for non-scratch golfers, and said other participant's scoring ability relative to the scoring ability of an expert amateur on a course of standard difficulty.

7. The method of claim 1, wherein said geographic location comprises one or more selected from the group consisting of a 9-hole golf course, an 18-hole golf course, a single hole, a driving range, a fairway, and a putting green.

8. The method of claim 1, wherein said golf competition comprises at least one 18-hole round of golf.

9. The method of claim 1, wherein said golf competition comprises a driving phase, a pitching phase, and a putting phase.

10. The method of claim 9, wherein said normalizing factor is applied to only one of said driving phase, said pitching phase, or said putting phase.

11. The method of claim 9, wherein said driving phases comprises having each of said participants drive a golf ball at least once, said drive having a centerline, and wherein said results for said participants in said driving phase are calculated from the length of said drive minus the distance from said centerline of said drive.

12. The method of claim 9, wherein said pitching phase comprises having each of said participants pitch from a predetermined distance from a hole, wherein said predetermined distance is selected based upon the age of said participant.

13. The method of claim 9, wherein said putting phases comprises having each of said participants putt from a predetermined distance from a hole, wherein said predetermined distance is selected based upon the age of said participant.

14. The method of claim 1, further comprising the step of allowing each of said participants to communicate with each other using translation software.

15. A golf scoring apparatus for a golf competition, wherein at least one participant plays in said competition at a first geographic location with a set of results used to determine a final score for said competition and at least one participant plays in said competition at a second geographic location with another set of results used to determine another final score for said competition, wherein said geographic areas are diverse, said apparatus comprising:

a user interface for electronically receiving said results of each of said participants;

a data source capable of storing said results and said final score for said competition, wherein said data source contains at least one normalizing factor for each of said diverse geographic locations relative to each other, said normalizing factor being based upon current information at the time each of said participants plays at said first and second geographic locations; and a data source interface in communication with said user interface and said data source, said data source interface being capable of calculating said final score for said competition from said results using said normalizing factor.

16. The apparatus of claim 15, wherein said user interface is further capable of transmitting said results and said final scores for each of said participants.

17. The apparatus of claim 15, wherein said data source comprises at least one relational database.

18. The apparatus of claim 15, wherein said user interface comprises a Web server in combination with a Web browser.

19. The apparatus of claim 15, further comprising a message server in communication with said user interface for transmitting messages to and from said participants.

20. The apparatus of claim 19, wherein said message server is selected from one or more of the group consisting an email server and a chat room.

21. The method of claim 19, wherein said message server is further capable of allowing each of said participants to communicate with each other using translation software.

22. The apparatus of claim 15, wherein said normalizing factor is based upon one or more selected from the group consisting of weather conditions at said geographic locations, the layout of said geographic locations, the complexity of said geographic locations, the playing difficulty of said geographic locations for scratch golfers, the playing difficulty of said geographic locations for non-scratch golfers, and said participant's, or said other participant's scoring ability relative to the scoring ability of an expert amateur on a course of standard difficulty.

23. In a golf scoring method for a golf competition, wherein at least one participant plays in said competition at a first geographic location with a set of results used to determine a final score in said competition and at least one participant plays in said competition at a second geographic location with another set of results used to determine another final score in said competition, wherein said geographic locations are diverse, said method comprising the steps of:

determining at least one normalizing current weather factor for each of said diverse geographic locations relative to each other at the time each of said participant plays at said first and second geographic locations;

compiling said results from each of said participants from each of said diverse geographic locations;

applying said normalizing current weather factor to each of said results; and determining a final score for said competition for each of said participants.

24. The method of claim 23, further comprising the steps of storing said normalizing weather factor in a data source;

compiling said results, storing said results in said data source; and storing said final score for each of said participants in said data source.

25. The method of claim 24, further comprising the step of allowing access to said data source to view said final score for each of said participants.

26. The method of claim 23, further comprising the step of allowing each of said participants to communicate with each other using email.

27. The method of claim 23, further comprising the step of allowing each of said participants to communicate with each other using a chat room.

28. The method of claim 23, further comprising the step of allowing each of said participants to communicate with each other using translation software.

29. The method of claim 23, wherein said geographic location comprises one or more selected from the group consisting of a 9-hole golf course, an 18-hole golf course, a single hole, a driving range, a fairway, and a putting green.

30. The method of claim 23, wherein said golf competition comprises at least one 18-hole round of golf.

31. The method of claim 23, wherein said golf competition comprises a driving phase, a pitching phase, and a putting phase.

32. The method of claim 31, wherein said normalizing weather factor is applied to only one of said driving phase, said pitching phase, or said putting phase.

33. The method of claim 31, wherein said driving phases comprises having each of said participants drive a golf ball at least once, said drive having a centerline, and wherein said results for said participants in said driving phase are calculated from the length of said drive minus the distance from said centerline of said drive.

34. The method of claim 31, wherein said pitching phase comprises having each of said participants pitch from a predetermined distance from a hole, wherein said predetermined distance is selected based upon the age of said participant.

35. The method of claim 31, wherein said putting phases comprises having each of said participants putt from a predetermined distance from a hole, wherein said predetermined distance is selected based upon the age of said participant.

36. A golf scoring apparatus for a golf competition, wherein at least one participant plays in said competition at a first geographic location with a set of results used to be determine a final score for said competition and at least one participant plays in said competition at a second geographic location with another set of results used to determine another final score for said competition, wherein said geographic areas are diverse, said apparatus comprising:

a user interface for electronically receiving said results of each of said participants;

a data source capable of storing said results and said final score for said competition, wherein said data source contains at least one normalizing current weather factor for each of said diverse geographic locations relative to each other at the time each of said participants plays at said first and second geographic locations; and a data source interface in communication with said user interface and said data source, said data source interface being capable of calculating said final score for said competition from said results using said normalizing current weather factor.

37. The apparatus of claim 36, wherein said user interface is further capable of transmitting said results and said final scores for each of said participants.

38. The apparatus of claim 36, wherein said data source comprises at least one relational database.

39. The apparatus of claim 36, wherein said interface comprises a Web server in combination with a Web browser.

40. The apparatus of claim 36, further comprising a message server in communication with said user interface for transmitting messages to and from said participants.

41. The apparatus of claim 40, wherein said message server is selected from one or more of the group consisting an email server and a chat room.

42. The apparatus of claim 40, wherein said message server is capable of allowing each of said participants to communicate with each other using translation software.

* * * * *